Nov. 18, 1941.     E. L. ROSE     2,263,315
POWER TRANSMISSION
Filed July 14, 1937     3 Sheets-Sheet 1
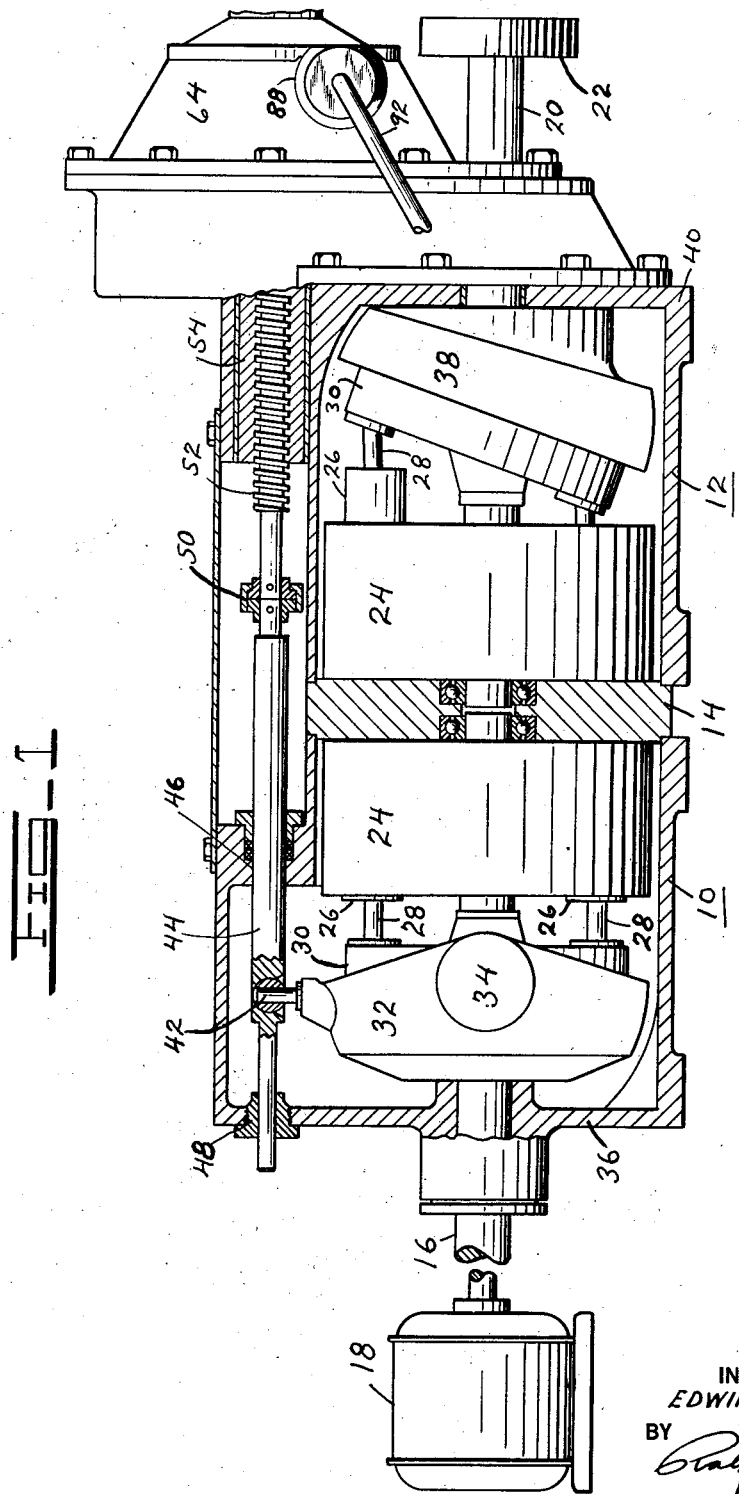
INVENTOR
EDWIN L. ROSE
BY
*Ralph L. Tweedale*
ATTORNEY Nov. 18, 1941.　　　E. L. ROSE　　　2,263,315
POWER TRANSMISSION
Filed July 14, 1937　　　3 Sheets-Sheet 2
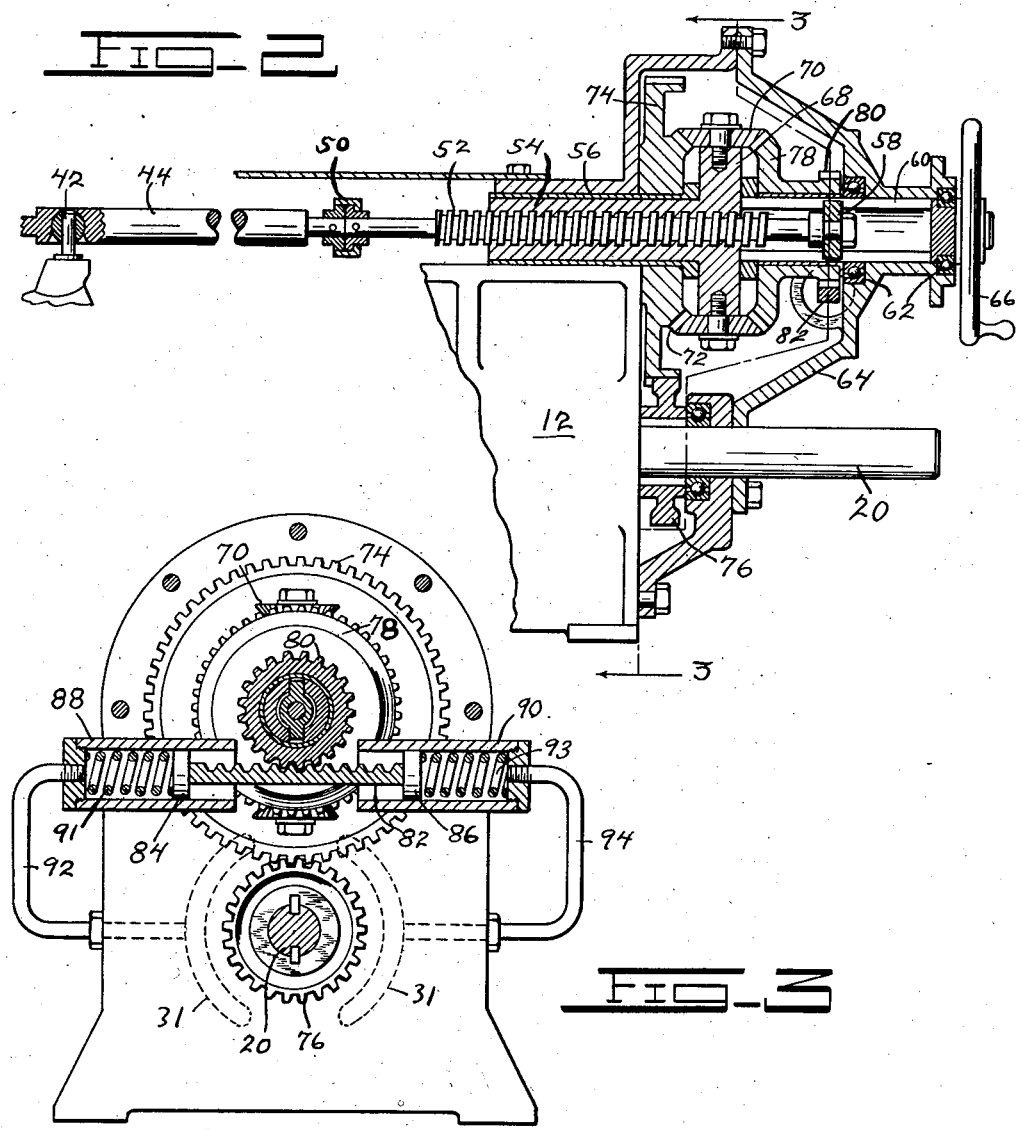
INVENTOR
EDWIN L. ROSE
BY
　　Ralph L. Tweedale
　　ATTORNEY

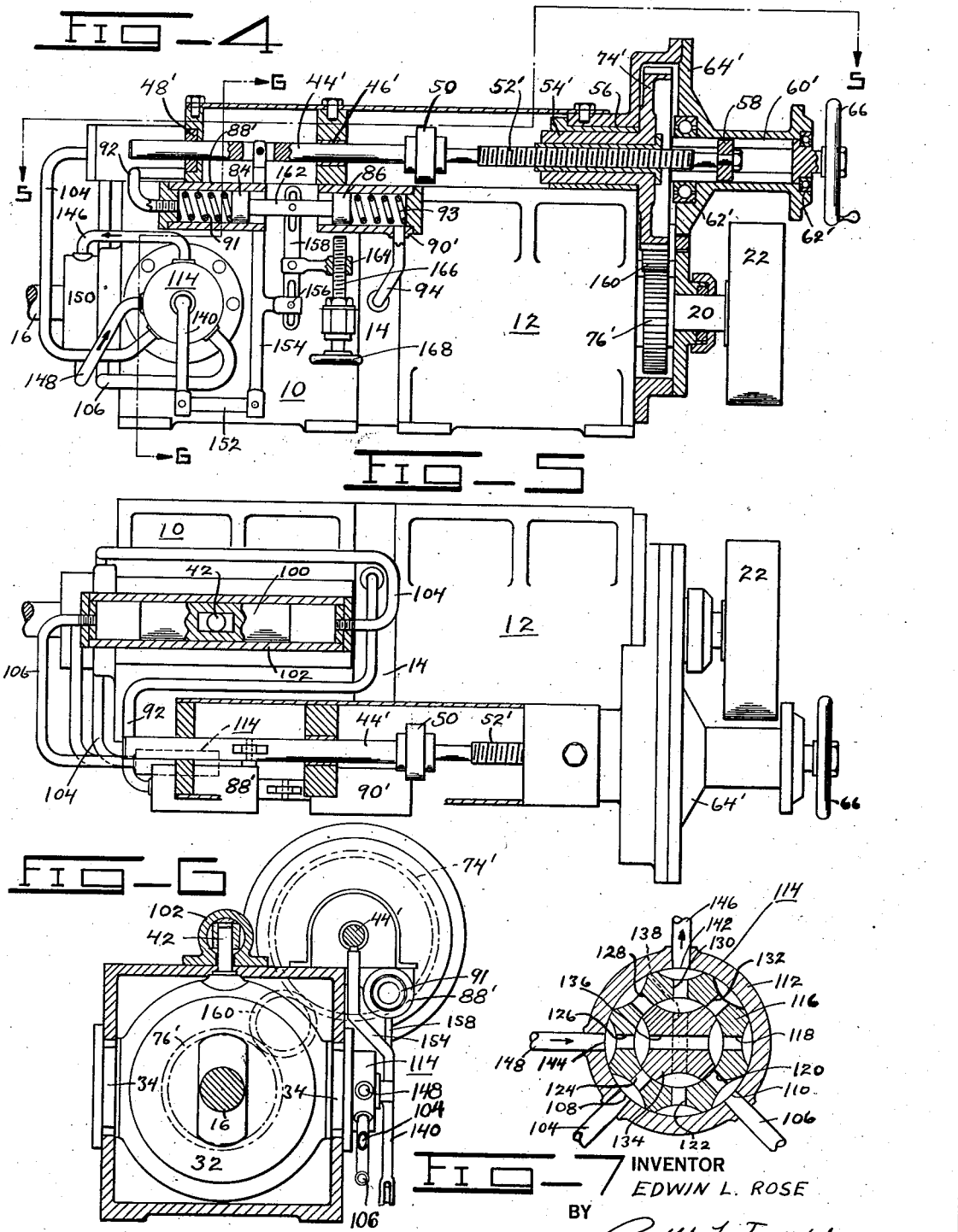

Patented Nov. 18, 1941

2,263,315

UNITED STATES PATENT OFFICE 2,263,315

POWER TRANSMISSION

Edwin L. Rose, Watertown, Conn., assignor to The Waterbury Tool Company, Waterbury, Conn., a corporation of Connecticut Application July 14, 1937, Serial No. 153,579

7 Claims. (Cl. 60—53)

This invention relates to power transmissions and particularly to those of type comprising two or more fluid pressure energy translating devices, one of which may function as a pump and the other function as a motor. The invention is particularly applicable to the type of transmission wherein the pump is of variable displacement and in which a follow-up control mechanism is provided by which the displacement of the pump is controlled, in accordance with the instantaneous error or difference between the position of a control input member such as a manually operable hand wheel, on the one hand, and the position of the fluid motor output shaft, on the other hand. The term "follow-up mechanism" and similar expressions are used hereafter in the specification and claims as referring to that part of the mechanism which receives movements both from the control input member and from the motor output shaft and which, by its differential action, controls the displacement of the pump. Power transmissions of this character are utilized for various purposes, among them being steering gears for ships and gun training mechanism for war vessels.

Where the load to be moved has considerable inertia and where the control input member is operated at high speed and with frequent rapid reversals, considerable difficulty has been experienced in the past in securing the necessary speed of response of the output shaft to the signal movements impressed upon the control input member. With the best control systems of the prior art, it is impossible to obtain satisfactory operation under such conditions, because there is a definite limit to the rapidity with which the system may be reversed, above which the lag in response of the system becomes so great that the movements of the output shaft no longer follow the movements of the control input member with any semblance of accuracy.

It is an object of the present invention to overcome these difficulties and to provide a power transmission and control system therefor, which, with an inertia load, is operable at high speeds and with quick reversals without loss of accuracy.

The difficulties enumerated heretofore are principally caused by two factors, both of which act to produce a lag in the response in the output member of the transmission. One factor is the slippage between the pump and motor units, due to unavoidable leakage in the system. This slippage is substantially in proportion to the operating pressure in the system at any instant. The other factor which produces lag is, in the case of a mechanical follow-up control mechanism, the unavoidable deflections in the mechanism due to elasticity of the parts. A corresponding factor which appears in mechanisms utilizing a hydraulic follow-up control mechanism is the unavoidable leakage in the hydraulic control mechanism. These factors are likewise substantially proportional to the operating pressure in the transmission working circuit.

According to the present invention, means are provided in the follow-up control mechanism for adding in to the error between the control input member and the transmission output member, a factor which is proportional to the fluid pressure in the main working circuit. Thus, at any instant, the displacement of the pump is adjusted to a value which depends not only upon the error between control input member and the transmission output member, but also upon the fluid pressure in the main working circuit. In other words, if the normal follow-up control mechanism requires the displacement controlling member of the pump to be in a certain position, the pressure responsive mechanism moves the displacement controlling member beyond that position by an amount which is proportional to the pressure in the working circuit. The control mechanism thus over-controls in order to anticipate the lag which would otherwise develop in the output member.

Further objects and advantages of the present invention will be apparent from the following description, reference being had to the accompanying drawings wherein a preferred form of the present invention is clearly shown.

In the drawings:

Fig. 1 is a longitudinal cross section of a power transmission incorporating one form of the present invention.

Figure 2 is a fragmentary sectional view showing the control mechanism incorporated in the device of Figure 1.

Figure 3 is a cross section on line 3—3 of Figure 2.

Figure 4 is a side view, partially in section, of a transmission incorporating a second form of the invention.

Figure 5 is a top view, partly in section, on line 5—5 of Figure 4.

Figure 6 is a cross section on line 6—6 of Figure 5.

Figure 7 is a fragmentary cross section of a follow-up control valve, incorporated in the second form of the invention.

Referring to Figure 1, there is illustrated a hydraulic transmission of the well-known "Waterbury" type, comprising a pump unit 10 connected to a motor unit 12 through the medium of a common valve-plate 14. The input shaft 16 of the pump is connected to an electric motor prime mover 18, while the output shaft 20 of the motor may be connected to any load device which it is desired to operate; the flywheel 22 representing a load device having considerable inertia.

The construction of the pump and motor units per se may be of any suitable type, the particular construction shown being typical of hydraulic transmissions of this character. Briefly, the pump mechanism may comprise a cylinder barrel 24 within which a plurality of pistons 26 are reciprocable with a variable stroke due to their connection by connecting rods 28 to a rotatable socket ring 30. The latter is journalled in a tilting box 32 mounted for operation on transverse trunnions 34, journalled in the pump casing 36. The socket ring 30 is connected to the shaft 16 through a universal joint. Where the cylinder barrel 24 abuts valveplate 14 it is provided with a plurality of ports leading from each cylinder, which cooperate with a pair of arcuate ports 31 (Figure 3) extending through the valveplate 14 to the corresponding parts of the motor cylinder barrel. The direction and amount of fluid delivered by pump 10 through the valveplate 14 depends upon the inclination of the tilting box 32. The tilting box 32 carries an operating stud 42, which is fastened by a pivoting and sliding connection to a reciprocable rod slidable in bearings 46 and 48. The motor construction may be similar to that of pump 10, except that in place of the tilting box 32, a fixed angle box 38 is secured to the casing 40 of the motor 12.

Referring now to Figure 2, control rod 44 is secured by a swivel 50 to a screw shaft 52 which is threaded in a rotatable nut 54, journalled in a bearing 56 on the housing of the motor 12. The right hand end of the screw shaft 52 has rigidly mounted thereon a driving dog 58, which is slidably but non-rotatably connected to a hollow sleeve 60, journalled on bearings 62 in the end cap 64 which covers the control mechanism. The sleeve 60 has rigidly secured thereto a hand wheel 66, whereby the same may be manually operated as desired; the hand wheel 66 thus typifying a control input member on which the input signal is impressed. The nut 54 is formed with a spider 68, carrying planetary bevel pinions 70, the latter meshing with a bevel gear 72 formed on a gear 74 which meshes with a gear 76 keyed to the output shaft 20 of the motor 12. Bevel gears 70 also mesh with a bevel gear 78, journalled on the exterior of the sleeve 60 and which carries a spur gear 80, meshing with a transverse rack 82 on the lower side of gear 80. Rack 82 carries on its opposite ends pistons 84 and 86 which are slidable in cylinders 88 and 90, formed integrally with the cover plate 64. These cylinders are connected by conduits 92 and 94 with the arcuate valve ports 31.

Springs 91 and 93 normally center the pistons 84 and 86 and permit them to be displaced to the right or the left in proportion to the working pressure in either of the valveports 31.

The screw and nut mechanism, comprising the parts 50 through 60 constitutes the follow-up control mechanism whereby the tilting box 32 may be controlled in a manner to cause the output shaft 20 to follow all movements imparted to the hand wheel 66. Inserted in this chain of mechanism, so to speak, is the differential 68—70—72—78, through which the movements of the rack 82 are transmitted to the tilting box 32.

In operation of this form of the invention, the motor 18 being energized, the pump shaft 16 is caused to revolve in one direction at a constant speed, causing the pump 10 to deliver fluid to the motor 12 in accordance with the position of the tilting box 32. The motor 12 causes the shaft 20 to drive the load 22 at a speed proportional to the amount of fluid delivered by the pump 10 and in a direction corresponding to the direction in which the fluid is pumped. Starting with the tilting box 32 in neutral position, as illustrated in Figures 1 and 2, if the hand wheel 66 be turned in one direction, the driving dog 58 is turned a corresponding amount, threading the screw shaft 52 through the nut 54 which is momentarily stationary, and moving the tilting box out of neutral position, say, for purposes of illustration, in a counterclockwise direction, Figure 1. As soon as the tilting box moves the least bit out of neutral position, the motor 12 starts to turn over, rotating the shaft 20 and with it, the gears 76 and 74. With the gear 78 stationary, rotation of the gear 74 causes rotation at half that speed, of the spider 68 which rotates the nut 54, causing the screw shaft 52 to be moved back to the right, thus returning the tilting box toward neutral. It will be seen that the tilting box moves only during a change in the velocity of the hand wheel 66, and that so long as the latter is operated at a constant velocity, the tilting box remains in a position at which the shaft 20 will be driven at a corresponding velocity.

Due to slippage between the pump 10 and motor 12, and due to elastic resilience in the control linkage and unavoidable lost motion of the parts, there is a certain lag between the movements of the hand wheel 66 and the responding movements of the shaft 20. As explained heretofore, the factors which produce this lag are substantially in proportion to the fluid pressure developed in the valve ports 31 which, of course, is proportional to the resistance to turning which the load 22 imposes on the motor 12.

This may be understood by considering the action, for example, with the hand wheel 66 being operated at a constant speed corresponding to the maximum available speed at which the transmission 10—12 is designed to operate. It may also be assumed that the pressure responsive pistons 84 and 86 are rendered inoperative. Under these conditions the tilting box 32 will be in full stroke position, let us say to the left in Figure 2, the hand wheel 66 being turned, top toward observer, and shaft 20 rotating, top away from observer. If now the hand wheel 66 be suddenly stopped and rotated in the opposite direction, the first thing that happens is that the shaft 20 continues to turn due to the fact that the tilting box is in full stroke position to start with and also due to the inertia of the load. This continued turning, however, operates the screw and nut differential mechanism 52—54 to bring the tilting box to neutral position.

Due to the inertia of the load the motor 12 acts as a pump tending to drive the pump as a motor and transposing and increasing the operating pressure in the system, thus tending to increase leakage, to increase the deflection of parts, and also to speed up the prime mover 18. These factors together cause the load device to lag in its response to the hand wheel 66. In other words, by the time the hand wheel 66 has stopped, the load device is still rotating in the same direction as before and moves past the position corresponding to that at which the hand wheel stopped and reversed. By the time that the load device comes to a stop, the hand wheel will have been rotated reversely, top away from observer, a considerable angle, the tilting box by this time having been moved to the right of neutral by a substantial distance. The load device thus begins to pick up speed in the reverse direction a considerable interval after the hand wheel was started reversely. If, at about the time that the load device begins to reverse, the hand wheel be again stopped and turned forwardly, top toward observer, it will be seen that the movements of the load device are now substantially ninety degrees out of phase with the movements of the hand wheel and that so long as the hand wheel is continually reversed at intervals approaching the interval of time lag there can be absolutely no correspondence between the movements of the load device and those of the hand wheel, and the device becomes extremely unstable.

The above actions occur with devices of the prior art. If the action of the pressure responsive pistons 84 and 86 and their connection through the differential gear 76 be considered, it will be seen that the actions above described no longer occur. Thus, when the hand wheel 66 is first stopped and reversed, the high pressure side of the device which formerly was at the right in Figure 3 transposes to the left-hand side and accordingly shifts the pistons 84 and 86 to the right rotating gears 80 and 78 counterclockwise in Figure 3, that is, top toward observer in Figure 2.

If we consider the hand wheel 66 as stationary for an instant while the shaft 20 continues to turn, top away from observer, it will be seen that the nut 54 will be turned, top toward observer, by the combined action of the gears 74 and 76, thus shifting the tilting box to the right in Figure 2 at a greater rate than would take place by the mere continued turning of shaft 20 alone. As soon as the load is relieved in the right-hand port 31 of the device and transferred to the left-hand port 31 due to the braking effect above described, the pistons 84 and 86 are pushed farther to the right thus moving the tilting box also farther to the right in Figure 2. Thus the tilting box is advanced to the right ahead of the position in which it would otherwise lie and the shaft 20 is caused to be accelerated in the reverse direction more rapidly than is dictated by the mere difference in angular position between the hand wheel 66 and shaft 20. In this manner the tilting box is "overcontrolled" to anticipate rapid reversals of the hand wheel 66, and this overcontrol is proportional to the degree of acceleration which must be imparted to the shaft 20 in order to follow the rapid reversals of the hand wheel 66.

By proper selection of the area of pistons 84 and 86, the characteristics of the springs 91 and 93 and the gear ratio of the rack 82 and pinion 80, a factor may be introduced into the control linkage through the differential 68—70, etc., which will cause the tilting box to be displaced out of neutral position by an amount sufficient to compensate for the lag of the system as a whole, under any maximum frequency of reversal of the control wheel 66 for which it may be necessary to provide. Since the pistons 84 and 86 cause the rack 82 to move to one side or the other in Figure 3, by an amount proportional to the pressure developed in the valve ports 31, it will be seen that the bevel gear 78 is moved a corresponding amount. This movement of the bevel gear 78 is added to the movement imparted to the control shaft 44 by the screw and nut follow-up control mechanism. Thus, there is provided a control system whereby any desired amount of lag in the response of the output shaft of the transmission may be anticipated by introducing an over-controlling factor in proportion to the working pressure in the transmission.

Referring now to Figures 4 through 7, there is illustrated a second form of the invention wherein a hydraulic control mechanism is utilized and which further provides means for adjusting the effect of the pressure responsive over-controlling mechanism. In these views, similar reference characters are used where the parts are identical to those previously described, while primed reference characters are used for parts equivalent to, but modified from the construction of the corresponding parts in the previous modification.

In this form of the invention, the tilting box operating stud 42 is connected to a control piston 100 which is reciprocable in a double ended cylinder 102 which is supplied with fluid through conduits 104 and 106. These conduits lead to ports 108 and 110 (see Figure 7), formed in the body 112 of a pilot valve 114 which is mounted on the side of the casing of pump 10, adjacent to one of the trunnions 34 of the tilting box 32. Rigidly secured to the trunnion is an annular valve member 116 having 8 equally spaced arcuate recesses in its outer surface. Each of these recesses communicates with the interior of valve member 116 through drilled passages 118 through 132. Rotatably mounted within the valve member 116 is a second valve member 134 having four arcuate depressions on its outside surface, opposite ones of which are connected by through-bores 136 and 138. Passages 120, 124, 126 and 130 serve to conduct fluid to and from the motor conduits 104 and 106 while passages 118, 122, 128 and 132 are for the purpose of admitting fluid under pressure to diametrically opposite recesses in order to balance the fluid pressure forces on the valve member 116. The valve member 134 is connected to an operating lever 140 located outside the housing 112. The housing 112 is also provided with ports 142 and 144 which communicate by conduits 146 and 148 with the suction and delivery sides respectively of an auxiliary pump 150 which is mounted around the shaft 16 of the pump 10 and driven thereby.

The parts thus far described constitute a follow-up servo motor for operating the tilting box 32 in accordance with movements imparted to the pilot control lever 140. This type of servo motor is well known in the art, and per se, forms no part of the present invention.

The pilot lever 140 is connected by a link 152 with a floating lever 154. The opposite end of the lever 154 is pivoted to a sliding control rod 44', while intermediate its ends the lever 154 is pivoted at 156 to a slotted lever 158. By the floating lever 154, the pilot lever 140 is made differentially responsive to the movements of the pivot 156 and of the control shaft 44'. The latter is connected by a swivel 50 to a screw shaft 52' which is threaded in nut 54', journalled in a bearing 56 on the housing of the motor 12. Shaft 52' carries a driving dog 58 slidably engaged with a sleeve 60' which is journalled on bearings 62' in the end cover 64' and operable by a control wheel 66. The nut 54' has integrally formed therewith a gear 74' which meshes through an idler pinion 160 with a gear 76' secured to the output shaft 20 of the motor 12. The control shaft 44' is thus connected by the screw and nut differential mechanism 52'—54'—66 to be operated in response to the instantaneous difference between the positions of the hand wheel 66 and of the shaft 20.

The lever 158 is pivotally and slidably connected at its upper end to a stem 162 which carries pistons 84 and 86 slidable in cylinders 88' and 90' in which are mounted springs 91 and 93, and which are connected by conduits 92 and 94 to the ports 31 of the valveplate 14. The operation of this form of the invention is analogous to that of the form previously described, with the following exceptions:

The tilting box is under the control of the pilot control lever 140 through the servo-motor mechanism. Thus, if the member 140 be moved clockwise in Figures 4 and 7, pressure fluid from the pump 150 will be admitted through conduit 148, port 144, bores 126, 136 and 128, to port 110, from which pressure fluid is delivered through conduit 106 to the left-hand end of the cylinder 102 in Figure 5. The piston 100 is thereby moved to the right, causing the tilting box to rotate clockwise. Fluid discharge from the right-hand end of the cylinder 102 passes through conduit 104, port 108, bores 124, 138 and 130, port 142 and conduit 146, to the return side of the pump 150. Clockwise movement of tilting box 32 carries with it the outer valve member 116, closing off the bores 120 and 124 from further communication with the pressure and suction sides of the auxiliary pump. If the control lever 140 be moved in the opposite direction, corresponding actions take place, except that the piston 100 is moved to the left. It will be seen that the lever 140 is differentially responsive to both the output of the screw and nut follow-up mechanism and to the movements of the pistons 84 and 86. That is, the movement imparted to the lever 140 is the algebraic sum or difference of the movements of pistons 84—86 and control rod 44'. The pistons 84 and 86 are connected into the main circuit in such a manner that whenever pressure builds up in one valve port due to load resistance at shaft 20 the lever 158 is moved in the direction which will place the pump on greater stroke than it would otherwise be placed by the hand wheel 66 alone. It will be therefore clear that an overcontrol is established whereby the tilting box is moved ahead of the position in which it would otherwise be placed by the follow-up mechanism alone. Thus, whatever lag is present in the operation of the servo-motor as well as that caused by slip in the transmission and deflection of elastic parts is compensated by placing the tilting box ahead of its normal position dictated by the follow-up mechanism. Under rapid reversals of the control input member 66 the compensation causes the load to follow the movements of the control input member 66 faithfully and accordingly eliminates the disastrous lag formerly experienced under such conditions with apparatus of this class as heretofore constructed. For the purpose of varying the degree or amount of over-control which is introduced by the pistons 84 and 86, the lever 158 is fulcrumed on a bracket 164 which is in turn threaded onto a screw shaft 166 operable by a hand wheel 168. By operating the hand wheel 168 the bracket 164 and the lever 158 may be moved up or down as desired. Moving the bracket up increases the amount of overcontrol while opposite motion decreases it. Thus it is possible to vary at will the controlling factor which is proportional to the working pressure whereby the accuracy of response may be maintained within any limits desired.

While the form of embodiment of the invention as herein disclosed, constitutes a preferred form, it is to be understood that other forms might be adopted, all coming within the scope of the claims which follow.

What is claimed is as follows:

1. In a fluid power transmission system the combination of a power driven pump, a fluid motor operated by fluid delivered by the pump and adapted to drive a load device, a control input member, control means differentially responsive to the operation of the control input member and of the motor for controlling the rate of fluid delivery to the motor, a member variably movable in accordance with changes in operating pressure in the system and means connecting said member to the control means for operation thereof in the direction of increased rate of delivery with increases in operating pressure due to load resistance.

2. In a fluid power transmission system the combination of a power driven variable displacement pump, a fluid motor operated by fluid delivered by the pump and adapted to drive a load device, a control input member, control means differentially responsive to the operation of the control input member and of the motor for controlling the pump displacement, a member variably movable in accordance with changes in operating pressure in the system and means connecting said member to the control means for operation thereof in the direction of increased pump displacement with increases in operating pressure due to load resistance.

3. In a fluid power transmission system the combination of a power driven pump, a fluid motor operated by fluid delivered by the pump and adapted to drive a load device, a member for controlling the rate of fluid delivery to the motor, means variably movable and constituting a control input element, follow-up control mechanism for controlling said member in proportion to the difference between the position of the control input element and the motor and means for amplifying the effect of the follow-up mechanism on said member in proportion to the working pressure developed in said system.

4. In a fluid power transmission system the combination of a power driven pump, a fluid motor operated by fluid delivered by the pump and adapted to drive a load device, a member for controlling the rate of fluid delivery to the motor, a second fluid motor for moving said member, means variably movable and constituting a control input element, follow-up control means for said second motor, responsive to the instantaneous error between the position of the control input element and the position of the first fluid motor and means responsive to changes in the operating pressure of the first fluid motor for causing the second motor to move said member beyond the position required by said follow-up control means whereby the lag in response of the first motor to movements of the control element is reduced.

5. In a fluid power transmission system the combination of a power driven pump, a fluid motor operated by fluid delivered by the pump and adapted to drive a load device, a member for controlling the rate of fluid delivery to the motor, a second fluid motor for moving said member, means variably movable and constituting a control input element, follow-up control means for said second motor, responsive to the instantaneous error between the position of the control input element and the position of the first fluid motor and means responsive to changes in the operating pressure of the first fluid motor for causing said member to move beyond the position required by said follow-up control means whereby the lag in response of the first motor to movements of the control element is reduced.

6. In a fluid power transmission system the combination of a power driven pump, a fluid motor operated by fluid delivered by the pump and adapted to drive a load device, a member for controlling the rate of fluid delivery to the motor, a follow-up servo motor for operating said member and having a pilot member for controlling operation of the servo motor in accordance with movements imparted to the pilot member, means variably movable and constituting a control input element, follow-up control mechanism for operating said pilot member, responsive to the instantaneous error between the position of the control input member and the position of the fluid motor, and means for causing movement of the pilot member beyond the position required by the follow-up control means by an amount sufficient to compensate for lag in the response of the servo motor to movements of the pilot member.

7. In a fluid power transmission system the combination of a power driven pump, a fluid motor operated by fluid delivered by the pump and adapted to drive a load device, a member for controlling the rate of fluid delivery to the motor, a follow-up servo motor for operating said member and having a pilot member for controlling operation of the servo motor in accordance with movements imparted to the pilot member, means variably movable and constituting a control input element, follow-up control mechanism for operating said pilot member, responsive to the instantaneous error between the position of the control input member and the position of the fluid motor, and means responsive to the working pressure developed in the system for causing movement of the pilot member beyond the position required by the follow-up control means by an amount sufficient to compensate for lag in the response of the servo motor to movements of the pilot member.

EDWIN L. ROSE.